United States Patent
Hedman et al.

[11] Patent Number: 5,943,377
[45] Date of Patent: Aug. 24, 1999

[54] METHOD AND DEVICE FOR BIT PATTERN DETECTION

[75] Inventors: Olle Hedman, Alingsås; Håkan Grenabo, Göteborg, both of Sweden

[73] Assignee: Telefonaktiebolaget LM Ericsson, Stockholm, Sweden

[21] Appl. No.: 08/810,276

[22] Filed: Mar. 3, 1997

[30] Foreign Application Priority Data

Mar. 4, 1996 [SE] Sweden .................................. 9600831

[51] Int. Cl.⁶ .................. H04L 7/00; H04J 3/06; H03M 13/00
[52] U.S. Cl. .......................... 375/368; 370/350; 371/38.1
[58] Field of Search ........................ 375/368, 365, 375/364, 354; 370/350, 304, 509, 510, 511, 512, 513, 514, 506; 371/38.1, 37.8, 30, 42, 46

[56] References Cited

U.S. PATENT DOCUMENTS

| | | | |
|---|---|---|---|
| 4,100,532 | 7/1978 | Farnbach | 382/106 |
| 4,404,542 | 9/1983 | Thomas, Jr. et al. | 364/715.11 |
| 4,414,677 | 11/1983 | Ive et al. | 375/366 |
| 4,638,497 | 1/1987 | Komatsu et al. | 375/368 |
| 4,667,334 | 5/1987 | Collec et al. | 375/368 |
| 4,727,558 | 2/1988 | Hall | 375/368 |
| 4,734,676 | 3/1988 | Huon et al. | 340/146.8 |
| 4,847,877 | 7/1989 | Besseyre | 375/368 |
| 5,285,185 | 2/1994 | Wiegand et al. | 340/146.2 |
| 5,295,198 | 3/1994 | Maney | 382/225 |
| 5,459,754 | 10/1995 | Newby et al. | 375/368 |
| 5,491,700 | 2/1996 | Wright et al. | 371/37.8 |
| 5,588,030 | 12/1996 | Riggle et al. | 375/368 |
| 5,727,036 | 3/1998 | Maertens | 375/369 |
| 5,742,647 | 4/1998 | Chaisemartin | 375/366 |

FOREIGN PATENT DOCUMENTS

| | | |
|---|---|---|
| 124 238 | 11/1984 | European Pat. Off. . |
| 483 399 | 5/1992 | European Pat. Off. . |
| 58-168347 | 10/1983 | Japan . |
| 63-316166 | 12/1988 | Japan . |
| 2 293 949 | 4/1996 | United Kingdom . |

*Primary Examiner*—Chi H. Pham
*Assistant Examiner*—Khai Tran
*Attorney, Agent, or Firm*—Burns, Doane, Swecker & Mathis, L.L.P.

[57] ABSTRACT

A device and a method for attaining a fault tolerant and quick bit pattern detection in a bit stream transmitted from an information transmitter to an information receiver. The device and the method create a table whose addresses are made up of candidate bit patterns. Positions in the table whose addresses correspond to the bit patterns sought, including corruptions of these bit patterns, contain information related to the bit pattern sought and information about how corrupted the candidate bit patterns are.

14 Claims, 4 Drawing Sheets

METHOD AND DEVICE FOR BIT PATTERN DETECTION

BACKGROUND

The present invention relates to a method and device for recognising, with error tolerance, a set of bit patterns in a bit stream, said set being limited with respect to the number of bit patterns and size. This application is based on application No. 9600831-3 filed in Sweden, the content of which is incorporated hereinto by reference.

In many areas where digital transmission of data is used, there is a need to recognise one or a certain number of so-called bit patterns or data words in the transmitted quantity of data. These data words can for instance be so-called synchronising words. Synchronising words are special data words which are used in order to synchronise a transmitter with a receiver which are not synchronised with one another. Synchronising of a transmitter and a receiver has to be performed in order for the receiver to know where the information starts and ends and in order to be able to reliably transmit the information between these. A transmitter and a receiver can be synchronised in many different ways, but a cheap and relatively simple way is by making use of synchronising words.

Transmission of data between two units can occur either in parallel or in series. By series transmission is meant that one amount of information is transferred at a time via a single data conductor where a quantity of information can be anything from one single binary bit (0 or 1) to symbols for example. By parallel transmission is normally meant that one larger quantity of information is transmitted each time via a number of parallel data conductors, typically multiples of eight bits. Conversion between the two manners of transmission can be done by using series to parallel converters and parallel to series converters.

Bit pattern detection can be made on a predetermined number of consecutive bits or on bits which are dispersed in a bit stream which is accessible serially. A candidate bit pattern is formed from the bit stream, the candidate bit pattern having the predetermined number of bits which the bit pattern has that it is wished to detect. Normally it is desirable that bit pattern detection occurs over the whole or parts of the bit stream, whereby new candidate bit patterns with the predetermined number of bits have to be formed. Candidate bit patterns are formed by extraction from the bit stream. New candidate bit patterns are suitably formed with the same speed as the bit speed in the bit stream by the bit stream being displaced by one bit position for each subsequent extraction of a new candidate bit pattern. This can also be referred to as the bit pattern detection being displaced one bit position in the bit stream.

The desire to recognise certain bit patterns is often combined with a desire that the recognition should be as fast as possible and moreover with as few operations as possible.

A known solution is based on using an XOR-construction. The XOR-construction compares each candidate bit pattern of a received bit stream with each and every bit pattern which it is wished to recognise. A bit pattern is viewed as being detected when the result of an XOR-operation is equal to zero. The solutions using XOR-constructions result in very high capacity requirements since all XOR-operations and comparisons to zero have to be fitted into a time interval which corresponds to the bit speed of the bit stream. Moreover, all XOR-operations and comparisons to zero have to be repeated for each candidate bit pattern which is formed from the bit stream. Given the aforementioned requirement on the speed, this puts extremely large requirements on the hardware.

A solution which requires many operations and where each operation requires many part-operations suffers from the fact that the clock frequency with which the hardware has to be clocked is necessarily very high. If the hardware's processing speed, which relates to its clock frequency, is not sufficiently high, there will not be time to carry out all the necessary operations and part-operations in an available time period. There is a theoretical and practical upper limit for how high a device's clock frequency can be, which gives an upper limit to how many operations and part-operations the hardware/device can carry out within a time period. A device which is clocked with a high clock frequency also unavoidably draws a large current, a feature which can be a large problem in mobile and, for example, battery-operated devices.

The XOR-method is suitable really only for transmission methods which have a low bit speed and a low error intensity, since the method is extremely calculation-intensive. Due to the fact that the XOR-method is calculation-intensive, the method can only cope with comparisons for those bit patterns which one is trying to find, even when using transmission methods which have a low transmission speed. The XOR-method is therefore not error tolerant (fault tolerant). In order to achieve error tolerance, i.e. to be able to detect bit patterns with a corruption (one or several bit errors), the aforementioned XOR-operations and comparisons have to be increased with XOR-operations and comparisons against every "corruption" (error) which is to be included in the detection. An increase in the number of XOR-operations and comparisons additionally have to be able to be carried out within the same available time period. An increase in the number of operations which need to be carried out within a given time period puts additional speed requirements on the hardware carrying it out. This leads to the included components being more expensive and to a higher current consumption, if it is indeed at all possible to carry this out.

A number of mobile telephone systems make use of TDMA (Time Division Multiple Access), for example PDC (Pacific or Personal Digital Cellular). In TDMA systems there is a strong desire to be able to combine the above-mentioned requirements on the speed with error tolerance during searching for bit patterns, for example synchronising words, in a bit stream. Error tolerance is a particularly important characteristic in radio-based information transmission systems since radio-based transmission is far from ideal. Transmission of information in TDMA systems, inter alia data and synchronising words occurs in allotted time slots and, by finding the synchronising words, the receiver can determine where in the time slots the information is located.

In U.S. Pat. No. 4,847,877 a device is described which is intended for detection of a bit pattern in a bit stream. The method first tries to detect part-quantities of the bit pattern which is being searched for in the bit stream, by comparing part candidate bit patterns from the bit stream with each acceptable part-quantity separately. Then, upon detection of an acceptable part-quantity, each separate bit in the bit stream is compared with the remaining bits in the searched bit pattern, whereby counters count the number of accepted comparisons. It can be seen as a disadvantage with this device that it requires a large number of operations and part-operations for the bit pattern detection and that it probably does not allow, in any greater degree, error tolerance in a simple manner.

SUMMARY

An object of the invention is to define a method and a device for quick bit pattern detection in a bit stream.

Another object of the invention is to define a method and a device which is able to achieve an error tolerant bit pattern detection in a bit stream.

A further object of the invention is to define a method and a device, by means of which various predefined synchronising words in a bit stream can be detected and identified with error tolerance.

A still further object of the invention is to define a method and a device by means of which the time position for a quantity of information in a time slot can be determined.

The above-mentioned objects are achieved in accordance with the invention by a method and a device where all the desired bit-patterns, including approved corruptions, are with error tolerance quickly and in a current-saving manner simultaneously detected per extracted candidate bit pattern in a bit stream. This is achieved by using a predefined table which is addressed by the candidate bit patterns. Positions in the table whose addresses correspond to the bit patterns which are being searched for, including acceptable corruptions of these, include information on whether there is a detection at the address. The positions also contain information related to the bit patterns which are being searched for. The information can consist of which bit pattern has been detected with error tolerance and information on how corrupted the candidate bit pattern is relative to the error tolerantly detected bit pattern. Positions in the table whose addresses do not correspond to any of the bit patterns which are being searched for, or acceptable corruptions of these, include information that there is no detection at that address.

The aforementioned objects are also achieved according to the invention by a method for detecting a certain number of predetermined bit patterns in a bit stream and, within a certain error tolerance, corruptions of the bit patterns. The method of detection comprises a number of steps. Firstly a candidate bit pattern is formed in the form of a certain number of bits from the bit stream. Then the candidate bit pattern is used as an address for addressing positions in a table. Each position in the table comprises hit information which defines a hit if the position's address corresponds with any of the predetermined bit patterns or the corruptions lying within the error tolerance. The hit information defines a miss in other positions. The positions in the table also comprise error information which, at positions where the hit information defines a hit, define how much the position's address deviates from the predetermined bit pattern on which the hit information defines a hit. The hit information in the position which is addressed by the candidate bit pattern is evaluated thereafter, whereby a result is produced which defines whether or not there is a detection, within the defined error tolerances, of any of the predetermined bit patterns.

The hit information at the positions in the table which define a hit are preferably the same as the predetermined bit pattern which the corresponding position represents or a reference to the predetermined bit pattern which the corresponding position represents.

The table can also consist of at least two part-tables. The addressing of the table then occurs for each part-table with a corresponding part of the candidate bit pattern sequentially for as long as the hit information in the part-tables defines a hit. Where the hit information in a part-table defines a miss or the last part-table has been addressed, the hit information from the addressed part-tables is evaluated and when a miss has occurred in one part-table's hit information, the entire candidate bit pattern is rejected.

The result can determine the time position for detected predetermined bit patterns in the bit stream. The predetermined bit patterns can also be synchronising words which are used for synchronising a bit stream between a transmitter and a receiver.

The aforementioned objects are also achieved according to the invention by a device which detects a certain number of predetermined bit patterns, and within a determined error tolerance, corruptions of the bit patterns, in a bit stream. The device suitably comprises extraction means, at least one table, addressing means and evaluation means. The extraction means are arranged to form, from the bit stream, a candidate bit pattern of a predetermined number of bits. The table is arranged with a number of addressable positions. Each position in the table comprises hit information which defines a hit if the position's address corresponds to any of the predetermined bit patterns or the corruptions lying within the error tolerance. The hit information defines a miss in other positions. Each position suitably also comprises error information which, at positions where the hit information defines a hit, defines how much the position's address varies from the predetermined bit pattern for which the hit information defines a hit. The addressing means is arranged to address the table with the candidate bit pattern, whereby the table gives hit information and error information from corresponding positions. The evaluation means in the device is arranged to evaluate the hit information from the candidate bit pattern's addressing of the table and from this creates the result which defines whether or not there is a detection, within the error tolerance, of any of the predetermined bit patterns.

The hit information at the positions which define a hit is suitably the same as the predetermined bit pattern which the corresponding position represents or a reference to the predetermined bit pattern which the corresponding position represents.

The table can also consist of at least two part-tables. The addressing means then addresses each part-table with a corresponding part of the candidate bit pattern sequentially for as long as the hit information in the part-tables defines a hit. When the hit information in a part-table defines a miss or the last part-table has been addressed, the evaluation means evaluates the hit information from the addressed part-tables and when a miss has occured in a part-table's hit information, the entire candidate bit pattern is rejected.

The result can determine the time position for detected predetermined bit patterns in the bit stream. The predetermined bit patterns can be synchronising words which are used for synchronising a bit stream between a transmitter and a receiver.

The extraction means, the addressing means and the evaluation means are suitably included in a digital signal processor.

The aforementioned objects are achieved in accordance with the invention also by a system for detecting a predetermined number of predetermined bit patterns in a bit stream and, within a determined error tolerance, corruptions of the bit patterns. The predetermined bit patterns are constituted by first and second part bit patterns and the corruptions of the bit patterns are constituted by first and second part corruptions. The system comprises extraction means, a first and a second part-table, addressing means and evaluation means. The extraction means is arranged to form, from the bit stream, a candidate bit pattern of a predetermined number of bits. The candidate bit pattern forms two part candidate bit patterns. The first and the second part-tables are arranged with a number of addressable positions. Each position in both part-tables includes hit information. The hit information defines a hit if the address belonging to the position corresponds with any of the first or second part bit patterns respectively or the first or second part corruptions respectively. The hit information defines a miss in other positions. Each position in the second part-table also includes error information. The error information defines, at positions where the hit information defines a hit, how much the position's address varies from the predetermined bit pattern for which the hit information has defined a hit. The addressing means is arranged to firstly address the first part-table with the first part candidate bit pattern and to reject the whole candidate bit pattern if a miss occurs from the hit information and, if a hit occurs from the hit information, to continue and address the second part-table with the second part candidate bit pattern. Whereby the second part-table gives hit information and error information from corresponding positions. The evaluation means is arranged to evaluate the hit information from respective part candidate bit pattern's addressing of respective part-tables and from this create a result which defines whether or not there is an error-tolerant detection of any of the predetermined bit patterns.

BRIEF DESCRIPTION OF THE DRAWINGS

The invention will now be described in more detail for explanatory, and in no sense limiting, purposes, with reference to the following figures, in which FIG. 1 schematically shows a TDMA frame, FIG. 2 schematically shows the coverage for base-stations in a mobile telephone system, FIG. 3 schematically shows the principle function of the invention.

DETAILED DESCRIPTION

Figure 1:
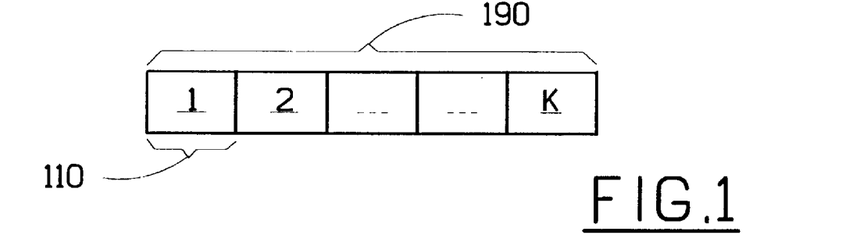

Mobile telephone systems are often so-called TDMA systems (Time Division Multiple Access). A TDMA transmitting system means that (see FIG. 1) a certain number, K, of so-called channels share one and the same frequency in that each channel sends its information within a certain time frame (time slot) 110 in a TDMA-frame 190. The information which the channel sends during its time slot includes, apart from data, synchronising words amongst other things. Synchronising words allow the receiving party to be able to decide where in the time slot the received bit stream is placed. This occurs in that the receiving party searches through the mass of information in a time slot for synchronising words. When the receiving party has found synchronising words in the time slot, the receiving party knows where in the time slot the searched-for "useful" information is located.

Need for synchronising within the field of mobile telephones can for example arise at so-called "hand-over". Consider the schematic coverage for the mobile telephone system in FIG. 2. The area which is covered by the mobile telephone system is divided into cells 211, 212, 213, 214, 221, 222. Centrally-placed in each cell there is a base station which communicates both with the mobile telephones which are in the cell and with a telephone exchange 210, 220 which is connected to a number of cells. In this example the exchange 210 is connected, inter alia, to the base stations in the cells 211, 212, 213, 214, and the exchange 220 is connected, inter alia, to the base stations in the cells 221 and 222.

Figure 2:
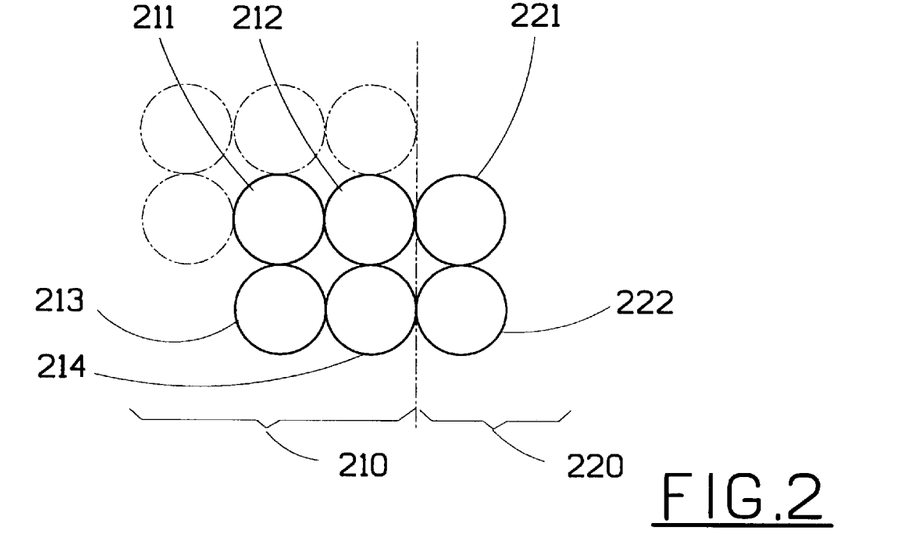

The base stations constantly transmit information on so-called control frequencies, including amongst other things information as to which channels (time slots) are vacant in that cell. This information is used by the mobile telephones which are new in the cell. A mobile telephone which is on its way out of a cell, for example cell 211, and on its way into the cell 212 can in this way receive a message about which time slot it should use in the new cell. The mobile telephone starts to use this time slot and with the aid of the synchronising word in the data stream, the base station synchronises the new mobile telephone's bit stream. Since both base stations (in the cells 211 and 212) communicate with the same exchange 210, the mobile telephone ought to be able, in an ideal case, to be "transferred" between the base stations without synchronising problems.

Problems however arise when a mobile telephone is to be displaced between cells which belong to different exchanges, where the base stations are not synchronised with each other. In those cases where a mobile telephone is to be displaced between base stations which belong to exchanges with different operators, the problems with synchronising during displacement between base stations are even greater. Problems can thus occur in the case where a mobile telephone is displaced from cell 212 which is connected to exchange 210 with its base station, to cell 221 which is connected to another exchange 220 with its base station.

In order to synchronise information from mobile telephones and to remain synchronised with these, the base stations in a mobile telephone system constantly search for synchronising words in time slots. Synchronising words can typically be about twenty bits long in a time slot which contains something in the order of several hundred bits. A TDMA frame normally comprises six time slots with at least one synchronising word per time slot.

In order to ensure against false detections of synchronising words, a requirement is normally made that the same synchronising word is to be detected in the same place in the same time slot a certain number of times. This implies a need for additional calculations which, for example, can occur by forming statistics about which synchronising words have been detected and where in the various time slots they were detected.

In order for the system to have a certain error tolerance, it is accepted that there are a number of errors in a detected synchronising word, which errors normally might concern about two bit errors. The additional calculations above should, in other words, also include the acceptable "corruptions" of the synchronising words that are being searched for. It is therefore an important object to be able to combine the above-mentioned requirements on speed with error tolerance. Error tolerance is a particularly important characteristic in radio-based systems since the transmission is far from perfect via radio and re-transmissions are time-consuming and maybe not possible if tough time requirements are to be met.

The invention has as its object the definition of a method and device which fulfils the requirements on speed, which the TDMA transmission system has, during the search for bit patterns which for example can be synchronising words. In order to clarify the invention, several embodiments of its use will now be described in connection with FIGS. 3–6.

Figure 3:
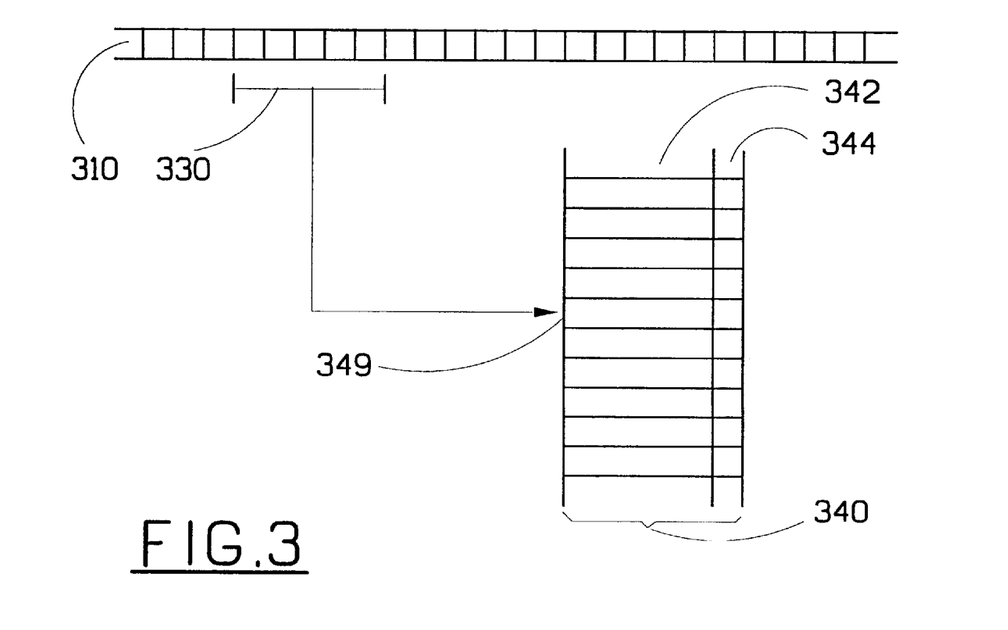

FIG. 3 shows a block diagram of a basic embodiment of a method and device according to the present invention. In order to apply the embodiment in a particular connection, it has been assumed that synchronising words are being looked for, which should not be seen as a limitation but merely as an illustration of an area of application for the invention. FIG. 3 shows a serial bit stream 310, in which synchronising words are being searched for, as well as a table 340. The table 340 is divided into two parts, a first part 342 and a second part 344.

Assume that the word length, for the synchronising words that are to be found in the bit stream, is L. In a basic arrangement and according to a basic method, a table with the size $2_L$ is included in such cases, which includes all the synchronising words that are being searched for, including the acceptable "corruptions" of these in a first part 342. A candidate bit pattern 330 of length L is formed by L bits being extracted from the bit stream. The candidate bit pattern is used to address a position 349 in the table, i.e. the candidate bit pattern is used as an address. Each address thus corresponds to a position in the table. Each time a new bit is received, the bit stream is shifted one position, whereby a new candidate bit pattern is extracted and thereby also a new address.

The positions in the table 340 whose addresses do not correspond to any of the synchronising words that are being searched for, or acceptable corruptions of these, include in the first part 342 an indication that the address does not correspond to a detection and can for example be the number zero. The positions in the table 340 whose addresses conversely correspond to any of the synchronising words that are being searched for or acceptable corruptions of these, include in the first part 342 an indication that the address corresponds to a detection. The indication that an address corresponds to a detection can be the uncorrupted synchronising word to which the candidate bit pattern corresponds or a reference to the uncorrupted synchronising word. The second part 344 of the table 340 includes information as to how many errors the candidate bit pattern has in relation to the uncorrupted synchronising word which is being searched for.

If the addressed position 349 contains any of the synchronising words that are being searched for, "hit" is indicated in the first part 342. At the same time there is an indication, as described above, of the number of "errors" in the second part 344. Thus, further calculations can easily be made as to where in the time slot a possible synchronising word is located.

In order to illustrate the method in a further embodiment, it will now be assumed for the sake of simplicity that a bit pattern is being searched for which is five bits long and equal to 10101 binary. In the embodiment, one bit error is accepted as being a corruption of the bit pattern which is being searched for. It is thus desirable in this case to find a bit pattern and its five different corruptions (see table 1).

TABLE 1

Bit pattern searched-for and acceptable corruptions

| | |
|---|---|
| Bit pattern | 10101 |
| One bit error | 00101 |
| One bit error | 11101 |
| One bit error | 10001 |
| One bit error | 10111 |
| One bit error | 10100 |

Since the bit pattern in this simple example is five bits long, a table having thirty-two positions ($2^5$) is needed in accordance with one embodiment of the invention. Table 2 shows how such a table may look. The thirty-two positions are here numbered from zero to thirty-one since this corresponds with the binary addressing which is used. It should be noted that it does not need to be an absolute addressing but can be a shift (offset) in a larger memory.

One position corresponds to each address. Two different types of information belong to each position, namely information on whether a hit has occurred or not (hit data, which corresponds to the first part 342 in the previous example) and information on how corrupted the hit is (error data, which corresponds to the second part 344 in the previous example). In the example, it can be concluded that the hit data part for all positions apart from the ones with addresses 5, 17, 20, 21, 23 and 29 contains the value zero. A zero in the hit data indicates that the position is not a hit and that the error data in such a case has no meaning.

TABLE 2

| | table/position content | | |
|---|---|---|---|
| Position | address | hit data | error data |
| 0 | 00000 | 0 | — |
| 1 | 00001 | 0 | — |
| 2 | 00010 | 0 | — |
| 3 | 00011 | 0 | — |
| 4 | 00100 | 0 | — |
| 5 | 00101 | 10101 | 1 |
| 6 | 00110 | 0 | — |
| 7 | 00111 | 0 | — |
| 8 | 01000 | 0 | — |
| 9 | 01001 | 0 | — |
| 10 | 01010 | 0 | — |
| 11 | 01011 | 0 | — |
| 12 | 01100 | 0 | — |
| 13 | 01101 | 0 | — |
| 14 | 01110 | 0 | — |
| 15 | 01111 | 0 | — |
| 16 | 10000 | 0 | — |
| 17 | 10001 | 10101 | 1 |
| 18 | 10010 | 0 | — |
| 19 | 10011 | 0 | — |
| 20 | 10100 | 10101 | 1 |
| 21 | 10101 | 10101 | 0 |
| 22 | 10110 | 0 | — |
| 23 | 10111 | 10101 | 1 |
| 24 | 11000 | 0 | — |
| 25 | 11001 | 0 | — |
| 26 | 11010 | 0 | — |
| 27 | 11011 | 0 | — |
| 28 | 11100 | 0 | — |
| 29 | 11101 | 10101 | 1 |
| 30 | 11110 | 0 | — |
| 31 | 11111 | 0 | — |

To find the bit pattern searched for, and its acceptable corruptions in this example, a candidate bit pattern is extracted of the same length as the bit pattern searched-for. The candidate bit pattern is then used as an address for addressing a position in table 2. From table 2, information is obtained about whether or not a hit has occurred and if a hit has occurred, how corrupted the candidate bit pattern is in relation to the bit pattern searched for. The information from the table can then be used in a suitable way for further calculations depending on the application. The procedure then starts again with a new candidate bit pattern being formed in order to thereby form a new address to table 2, and so on.

Assume that a candidate bit pattern has been extracted which is 11011 binary. This corresponds to position 27 in table 2. Position 27 contains hit data with the value 0 which indicates that, in this case, there is no hit with the bit pattern searched-for or even an acceptable corruption. Since the hit data includes "0", the error data has no relevance at all, which has been indicated with a "–" sign in table 2.

If, on another occasion, a candidate bit pattern has been extracted which is 11101 binary, this corresponds instead to position 29 in table 2. The hit data in position 29 includes the value 10101 which is distinct from 0 and indicates that a hit has occurred in this case.

The hit data either gives the searched-for bit pattern directly as in this case, or indirectly as a reference to the bit pattern which has occurred. When only one bit pattern is being searched for, a 0 or 1 in the hit data is sufficient to indicate a hit or no hit. If several different and/or longer bit patterns are being searched for, it may be suitable to use a reference which indicates that there is a hit and which of the searched-for bit patterns indicated a hit.

In the last example, the candidate bit pattern is 11101 which is not the same as the bit pattern 10101 which is being searched for, but the candidate bit pattern belongs to the group of bit patterns with acceptable corruption. The error data in the table gives an indication of whether there is a perfect hit or a hit with an acceptable corruption. In position 29 on the error data there is a "1" which means that the candidate bit pattern is an acceptable corruption with one bit error.

As a summary, a basic embodiment of the invention can be described as a device and a method which simultaneously search for all bit patterns N and their acceptable corruptions M of a length L for each candidate bit pattern. A candidate bit pattern of length L is used as an address in a table with a size $2^L$. In the positions whose addresses correspond to one of the bit patterns N searched for, or acceptable corruptions M, a hit is indicated. A hit is indicated for example by the position defining which of the uncorrupted bit patterns N it is, or a reference which corresponds to which of the uncorrupted patterns it is. In all other positions a miss is indicated, for example by there being a "0".

Figure 4A:
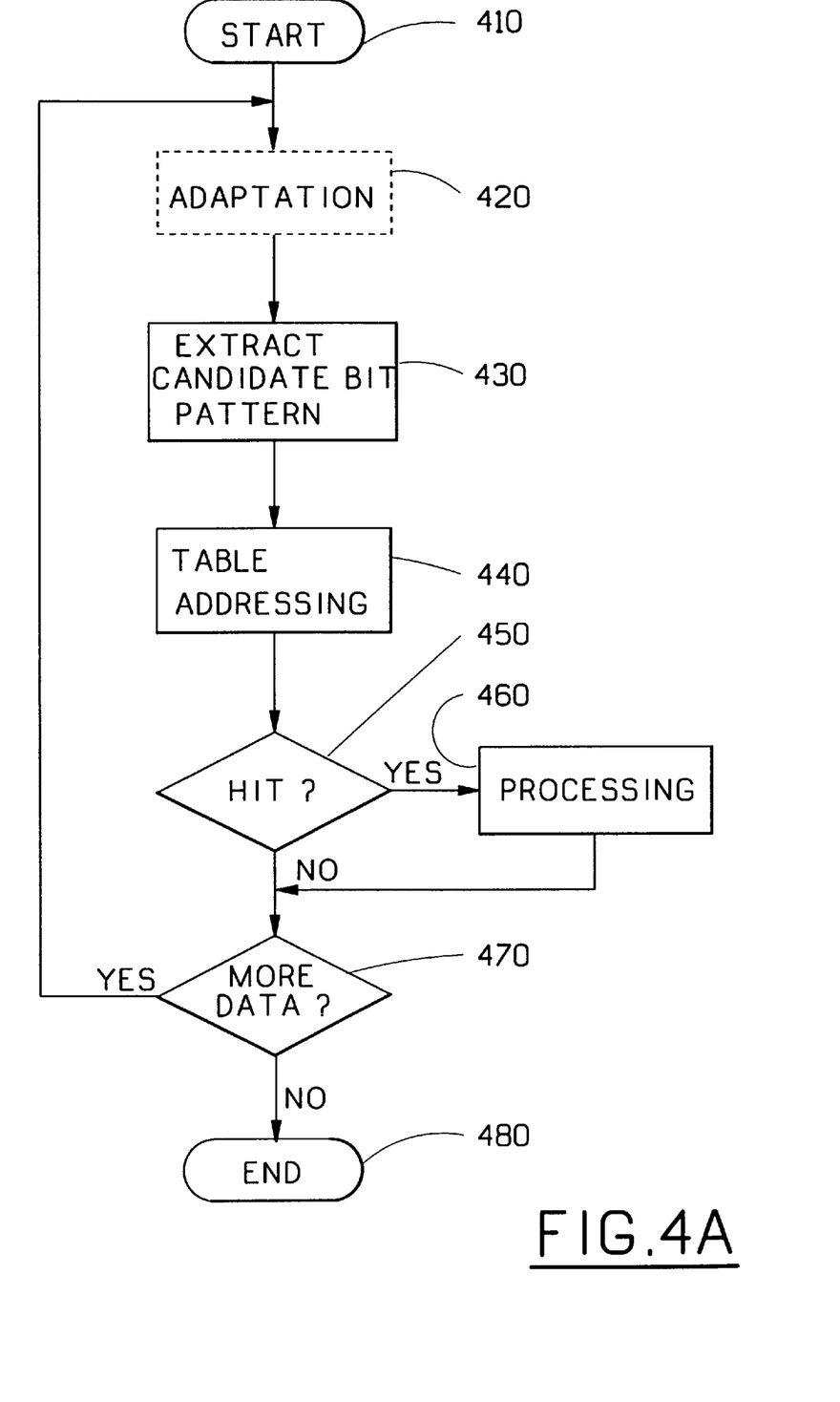
FIG. 4A shows a flow chart of a method according to the invention.

FIG. 4A shows a flow chart of an application of the invention for detecting bit patterns. The first step is a start step 410 which can be a hardware reset, or a software entry point. The start step 410 can also advantageously create a predefined table which later steps use, in the case where the predefined table has not been created earlier. Then an adaptation step 420 preferably occurs, which adapts the information flow format to a format which is suitable for the following steps. The adaptation can consist of series to parallel conversion if the information flow format is a series bit stream or some other type of adaptation of the data to the following steps. Then comes an extraction step 430 which extracts a candidate bit pattern.

When a candidate bit pattern is extracted, this is used as an address for addressing a position in the predefined table. The table-addressing occurs in an addressing step 440. All positions in the table, as mentioned above, most preferably consist of at least two parts, namely a first part which includes hit data and second part which includes error data. The table must at least include the hit data part. The hit data part at the position in the table which was addressed in the addressing step 440 is then tested in the test step 450. In the case where no hit is indicated, the current candidate bit pattern is rejected and the procedure continues to a "more data" test step 470. If however a hit is indicated, the procedure goes ahead to a processing step 460.

In the processing step 460 a determination is made as to which searched-for bit pattern was detected by making use of the hit data part. The candidate bit pattern is not necessarily the same as the searched-for bit pattern which was detected, but can be an acceptable corruption. The processing step 460 possibly also determines, by using the error data part, if it was a perfect hit, i.e. zero errors, or a hit within an error margin of a predetermined number of bit errors. The processing step 460 can also possibly process data and error data further, in order for example to determine where in the bit stream such hits occur. The processing step 460 preferably sends hit data onward and any error data and/or any results of additional processing to other treatment steps.

When the treatment of data is complete in treatment step 460, the procedure continues to the "more data" test step 470. The test step 470 can be superfluous in certain applications. Certain applications only use the procedure once at a time, i.e. only one candidate bit pattern is extracted from the bit stream and the procedure ends and goes to the end step 480 directly in order to then carry out other processing before it may be time to start the whole procedure again. Other applications allow the procedure (which can be carried out both purely software-wise or purely hardware-wise or as a combination) to continue continuously. This means that the procedure continues and jumps to the adaptation step 420 and then to the extraction step 430 where a new candidate bit pattern is extracted from the bit stream. The test step 470 copes with the extremes as well as everything inbetween.

If L is large (L=bit pattern length), i.e. the table is large and requires a lot of memory, it can be solved by two, or alternatively four or more addressing actions being made for each candidate bit pattern with part candidate bit patterns where each part candidate bit pattern has the length L/2 or L/4 and so on. If synchronising words of 20 bits are used as in a typical TDMA-system, the basic embodiment of the invention requires the use of a table with 1048576 positions.

If conversely the candidate bit pattern is for example divided up into two equally large parts and the first and the second part candidate bit pattern each addresses its own respective table with the size $2^{L/2}$, each table in the example with synchronising words of 20 bits will have a size of only 1024 positions. In this case, this gives a saving of 1046528 positions.

Firstly, the first part candidate bit pattern addresses its table and when a hit occurs the second part candidate bit pattern addresses its table. The entire candidate bit pattern is rejected as soon as there is no hit at one of the addresses. This means that, even in this case, generally only one addressing needs to be made. Only in the cases where the first part candidate bit pattern gives a hit does the second addressing need to be performed with the second part candidate bit pattern in the second table.

Figure 4B:
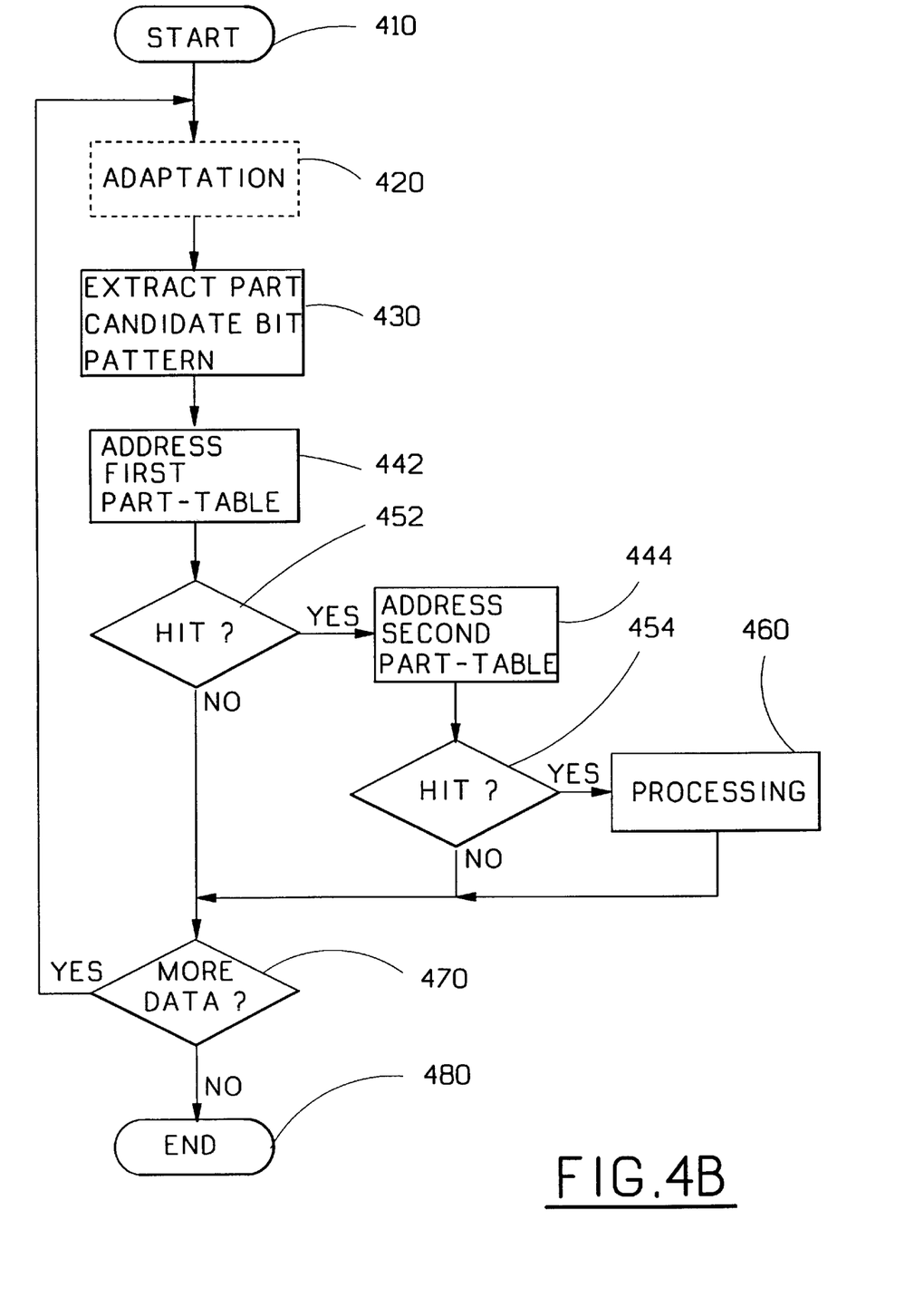
FIG. 4B shows a flow chart of a further embodiment according to the invention.

FIG. 4B shows a flow chart for a variation of the more-advanced embodiment of the invention. The flow chart illustrates the case where the table is divided up into two part-tables. The first three steps, the start step 410, the adaptation step 420 and the extraction step 430, can basically operate according to the description of FIG. 4A above. The earlier addressing step is now divided up into two parts, of which the first part-addressing step 442 uses the first half of the candidate bit pattern from the extraction step 430 in order to address a first part-table. Both of the part-tables which are used are suitably predefined, as mentioned previously. The first part-addressing gives at least information as to whether it is a hit or not. In the case where the first part-addressing indicates no hit, the first part-test step 452 rejects the whole candidate bit pattern and the procedure continues onward to a "more data" test step 470. If conversely the first part-addressing indicates a hit, the first part-addressing step 452 sends the procedure on to a second part-addressing step 444.

The second part-addressing step 444 uses the second half of the candidate bit pattern in order to address a second part-table. In the case that the second part-addressing indicates no hit, the whole candidate bit pattern is rejected by the second part-test step 454 and the procedure is sent on to the "more data" test step 470. If conversely the second part-addressing indicates a hit, the second part-test step 454 sends the procedure on to a processing step 460. The processing step 460 operates in principle as described previously in accordance with FIG. 4A above. The test-step 470 also operates in principle as previously described in accordance with FIG. 4A and thus determines when the procedure is to end.

Figure 5:
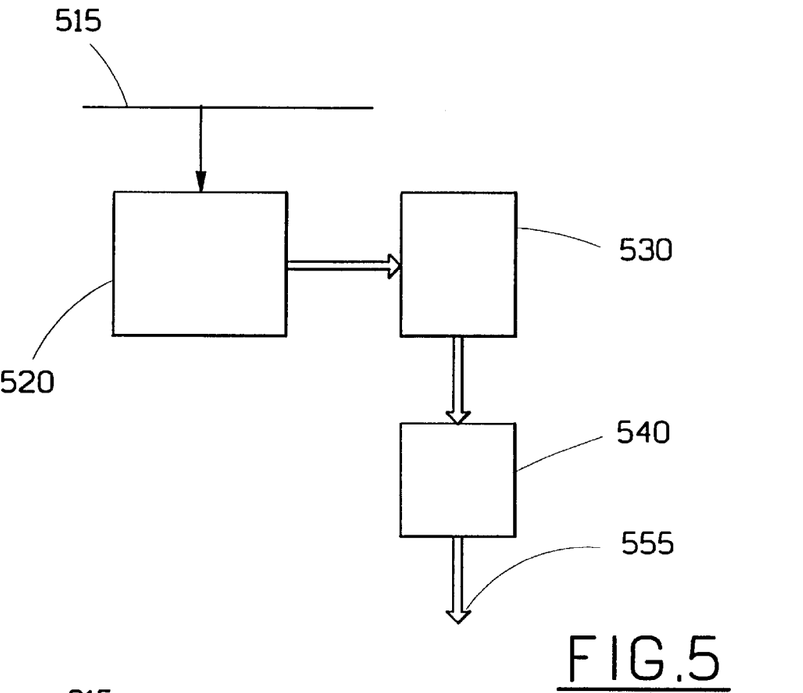
FIG. 5 shows a block diagram of one embodiment of a device according to the invention.
Figure 6:
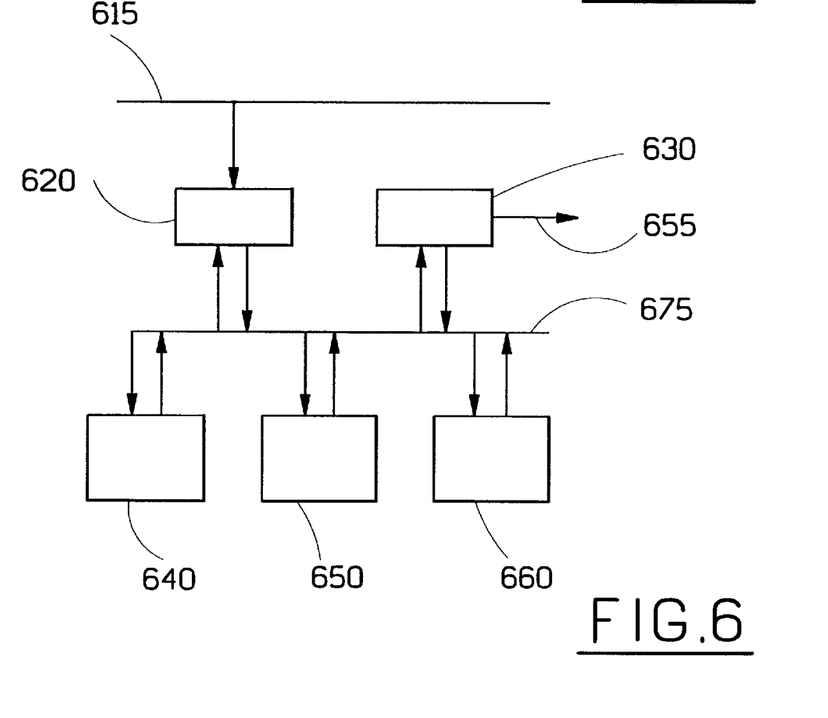
FIG. 6 shows a block diagram of a further embodiment of a device according to the invention.

The present invention can be put into apparatus-form either as pure hardware, as pure software or as a combination of hardware and software. If the method according to the invention is realised in the form of software, it can be completely independent or it can be one part of a larger program. The software can suitably be located in a general computer or a dedicated computer such as a digital signal processor (DSP). FIGS. 5 and 6 show two different ways of putting the present invention into apparatus-form and should only be seen as examples of possible embodiments.

FIG. 5 shows a block diagram of one example of an embodiment of a device according to the invention, basically in the form of hardware. An information flow in the form of a bit stream is accessible at 515 and is fed into an extraction block 520 for candidate bit patterns. The extraction block 520 is suitably provided with means for adapting the information flow 515 to other hardware such as for example a continual series to parallel conversion with the aid of, for example, a shift register function. During use in TDMA systems, means for frame-synchronising can for example be included in the extraction block 520.

Included in the device is at least one memory 530 for storing the table according to the invention. The memory 530 can be a volatile memory, but for an apparatus purely in hardware form a memory 530 is preferred which is non-volatile and predefined with the table according to the invention. The table in the memory 530 is addressed by the candidate bit pattern from the extraction block 520 and gives the result to a processing block 540 which suitably has means, such as comparators, for confirming whether the candidate bit pattern gave rise to a hit or not. The processing block 540 suitably sends the result 555, such as which bit pattern was a hit and how many bit errors there were in the candidate bit pattern from the searched-for bit pattern and possibly additional information to other units for possible further processing.

Each block according to FIG. 5 can for example be constituted either with the aid of discrete gates or memories, in more or less complex circuits, or as gate functions in one or more customer-specified circuits (ASIC—Application Specific IC).

FIG. 6 shows a block diagram of an embodiment of a device which uses the invention basically in software form executed in a computer. The computer suitably comprises at least two interface units (I/O) 620, 630, a control unit (CPU) 660, a program memory (RAM, ROM, PROM, EPROM, EEPROM) 650 and a data memory (RAM, EEPROM) 640. The information flow in the form of, for example, a bit stream is accessible at 615 and is fed into a first interface unit 620. The first interface unit 620 adapts, amongst other things, the information flow to the information transfer between the different units which occurs via an address and data bus system 675. The address and data bus system 675 includes means for ensuring that all necessary address, data and control signals are coupled together between all units.

The control unit 660 performs calculations and controls and regulates the information flow between all the units. The program memory 650 which is preferably predefined, suitably includes the control program with instructions for the control unit 660 so that the device can perform the method according to the invention. The data memory 640 or possibly the program memory 650 contains the table according to the invention. The data memory 640 is preferably also provided with space for permanent and temporary storage of, amongst other things, variables which are used by the control unit 660.

This second example of a way of putting the invention into apparatus-form also comprises a second interface unit 630. The second interface unit 630 suitably has the task of first, possibly storing, and then forwarding the result 655. The type of information and result which is sent on to other units, is determined by the specific embodiment.

All these blocks and units can be physically completely separately constituted in different units, each block can even consist of a plurality of physical units, or physically consist of a single unit or some variation therebetween, i.e. certain blocks are comprised in a physical unit whilst others are not. The separate blocks or the whole computer can be shared with other functions with the aid of for example, time sharing. A preferred variation is that the method is carried out as a part in a digital signal processor.

The invention is not limited to the embodiments described above but may be varied within the scope of the appended patent claims.

What is claimed is:

1. A method for detecting a certain number of predetermined bit patterns in a bit stream and, within a determined error tolerance, corruptions of the bit patterns, comprising the following steps:

forming a candidate bit pattern having a determined number of bits from the bit stream;

using the candidate bit pattern as an address for addressing positions in a table, wherein each position in the table comprises:

hit information which defines a hit if the position's address agrees with any of the predetermined bit patterns or the corruptions within the error tolerance and which defines a miss otherwise, and error information which, at positions where the hit information defines a hit, defines how much the position's address deviates from the predetermined bit pattern for which the hit information defines a hit; and evaluating the hit information in the position which is addressed by the candidate bit pattern, whereby a result is created which defines whether or not any of the predetermined bit patterns within the determined error tolerance is detected and, if any of the predetermined bit patterns within the determined error tolerance is detected, identifies which of the predetermined bit patterns is detected.

2. The method of claim 1, wherein the hit information at positions in the table which define hits is the same as the predetermined bit patterns which the positions represent.

3. The method of claim 1, wherein the hit information at positions in the table which define hits is the same as respective references to the predetermined bit patterns which the positions represent.

4. The method according to claim 1, wherein a time position for a detected predetermined bit pattern in the bit stream is determined based on the result.

5. The method according to claim 1, wherein the predetermined bit patterns are synchronizing words which are used for synchronizing a bit stream between a transmitter and a receiver.

6. A method for detecting a certain number of predetermined bit patterns in a bit stream and, within a determined error tolerance, corruptions of the bit patterns comprising the following steps:

forming a candidate bit pattern having a determined number of bits from the bit stream;

using the candidate bit pattern as an address for addressing positions in a table, wherein each position in the table comprises:

hit information which defines a hit if the position's address agrees with any of the predetermined bit patterns or the corruptions within the error tolerance and which defines a miss otherwise, and error information which, at positions where the hit information defines a hit, defines how much the position's address deviates from the predetermined bit pattern for which the hit information defines a hit; and evaluating the hit information in the position which is addressed by the candidate bit pattern, whereby a result is created which defines whether or not any of the predetermined bit patterns within the determined error tolerance is detected and, if any of the predetermined bit patterns within the determined error tolerance is detected, identifies which of the predetermined bit patterns is detected, wherein the table includes at least two part-tables; each part-table is addressed with a corresponding part of the candidate bit pattern sequentially for as long as the hit information in the part-tables defines a hit; when the hit information in a part-table defines a miss or the last part-table has been addressed, the hit information from the addressed part-tables is evaluated; and where a miss has occurred in a part-table's hit information, the entire candidate bit pattern is rejected.

7. A device for detecting a certain number of predetermined bit patterns in a bit stream and, within a determined error tolerance, corruptions of the bit patterns, the device comprising:

extraction means for forming a candidate bit pattern of a predetermined number of bits from the bit stream;

at least one table having a number of addressable positions, wherein each position in the table includes:

hit information which defines a hit if the position's address agrees with any of the predetermined bit patterns or the corruptions lying within the error tolerance and where the hit information defines a miss in other positions, and error information which, at positions where the hit information defines a hit, defines how much the position's address deviates from the predetermined bit pattern for which the hit information defines a hit;

means for addressing the table with the candidate bit pattern, whereby the table gives hit information and error information from corresponding positions;

means for evaluating the hit information from the candidate bit pattern's addressing of the table and, based on the evaluation, for creating a result which defines whether or not there is a detection of any of the predetermined bit patterns within the determined error tolerance, and, if there is a detection of any of the predetermined bit patterns within the determined error tolerance, identifies which of the predetermined bit patterns is detected.

8. The device of claim 7, wherein the hit information at the positions which define hits is the same as the predetermined bit patterns which corresponding positions represent.

9. The device of claim 7, wherein the hit information at the positions which define hits is the same as references to the predetermined bit patterns which corresponding positions represent.

10. The device of claim 7, wherein the predetermined bit patterns are synchronizing words which are used for synchronizing a bit stream between a transmitter and a receiver.

11. A device for detecting a certain number of predetermined bit patterns in a bit stream and, within a determined error tolerance, corruptions of the bit patterns, the device comprising:

extraction means for forming a candidate bit pattern of a predetermined number of bits from the bit stream;

at least one table having a number of addressable positions, wherein each position in the table includes:

hit information which defines a hit if the position's address agrees with any of the predetermined bit patterns or the corruptions lying within the error tolerance and where the hit information defines a miss in other positions, and error information which, at positions where the hit information defines a hit, defines how much the position's address deviates from the predetermined bit pattern for which the hit information defines a hit;

means for addressing the table with the candidate bit pattern, whereby the table gives hit information and error information from corresponding positions;

means for evaluating the hit information from the candidate bit pattern's addressing of the table and, based on the evaluation, for creating a result which defines whether or not there is a detection of any of the predetermined bit patterns within the determined error tolerance, and, if there is a detection of any of the predetermined bit patterns within the determined error tolerance, identifies which of the predetermined bit patterns is detected, wherein the table includes at least two part-tables; the addressing means addresses each part-table with a corresponding part of the candidate bit pattern sequentially for as long as the hit information in the part-tables defines a hit; where the hit information in a part-table defines a miss or the last part-table has been addressed, the evaluating means evaluates the hit information from the addressed part-tables; and where a miss has occurred in a part-table's hit information, the entire candidate bit pattern is rejected.

12. The device of claim 11, wherein the predetermined bit patterns are synchronizing words which are used for synchronizing a bit stream between a transmitter and a receiver.

13. The device of claim 12, wherein the extraction means, the addressing means, and the evaluating means are included in a digital signal processor.

14. A system for detecting a certain number of predetermined bit patterns in a bit stream and, within a determined error tolerance, corruptions of the bit patterns, where the predetermined bit patterns include first and second part bit patterns, and corruptions of part bit patterns include first and second part corruptions, the system comprising:

extraction means for forming a candidate bit pattern of a predetermined number of bits from a bit stream;

means for forming two part candidate bit patterns from the candidate bit pattern;

first and second part-tables, each having a number of addressable positions, wherein each position in both part-tables includes:

hit information which defines a hit if the position's assigned address agrees with any of the first or second part bit patterns respectively or the first or second part corruptions respectively and where the hit information defines a miss in other positions;

and each position in the second part-table also includes:

error information which, at positions where the hit information defines a hit, defines how much the position's address deviates from the predetermined bit pattern for which the hit information defines a hit;

means for addressing the first part-table with the first part candidate bit pattern and, if a miss occurs from the hit information, for rejecting the entire candidate bit pattern, and if a hit occurs from the hit information, for addressing the second part-table with the second part candidate bit pattern, whereby the second part-table gives hit information and error information from corresponding positions;

means for evaluating the hit information from respective part candidate bit patterns' addressing the respective part-table, and for creating, based on the evaluation, a result which defines whether or not there is an error tolerant detection of any of the predetermined bit patterns.

* * * * *